May 22, 1945. A. J. MANSFIELD 2,376,440
HARVESTING APPLIANCE
Filed March 5, 1943
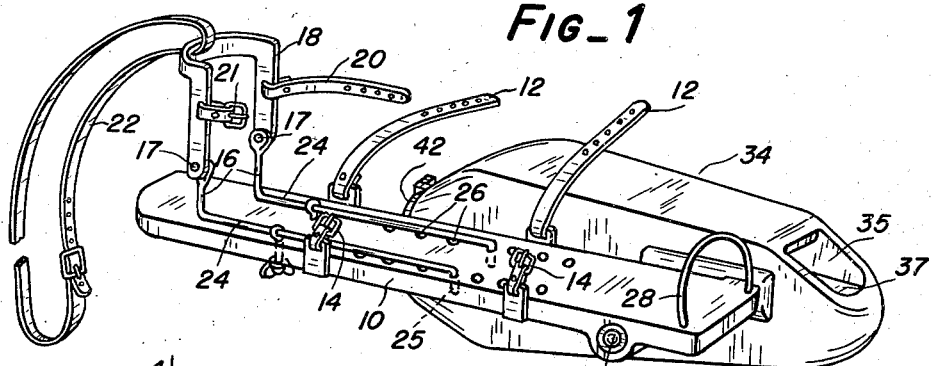
Fig_1
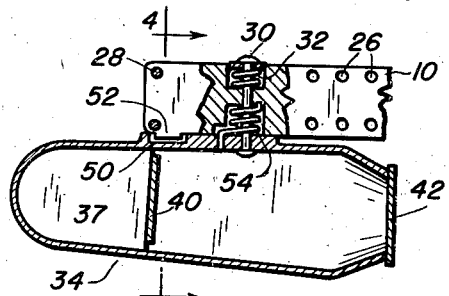
Fig_2
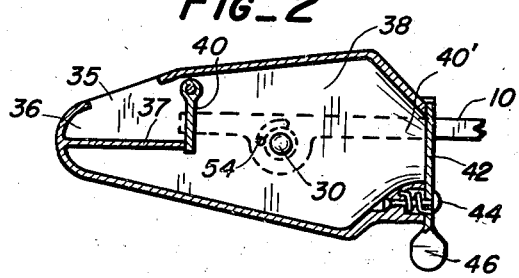
Fig_3
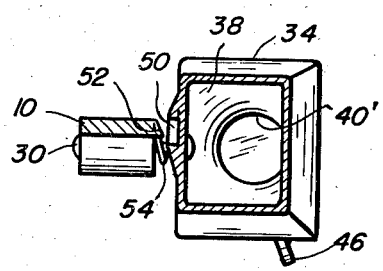
Fig_4
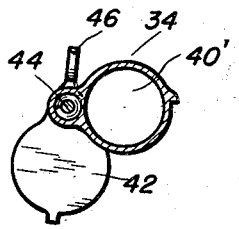
Fig_6
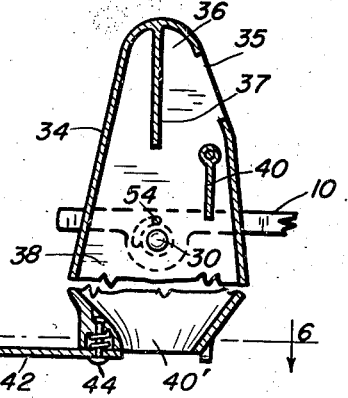
Fig_5
AUBY J. MANSFIELD
INVENTOR
BY Smith & Tuck
ATTORNEYS Patented May 22, 1945

2,376,440

UNITED STATES PATENT OFFICE 2,376,440

HARVESTING APPLIANCE

Auby J. Mansfield, Seattle, Wash.

Application March 5, 1943, Serial No. 478,099

4 Claims. (Cl. 56—329)

This invention relates to a harvesting appliance and more particularly to an appliance for use by berry and fruit pickers in the handling of the harvested products.

It is well known in the harvesting of small fruits that considerable difficulty is experienced by the harvester in using two hands not only to handle the vines and to pick the fruit, but also to handle the fruit to a collection container.

Having in mind the defects of the prior art devices which were of limited usefulness or not applicable to the problem that I solve, it is an object of my invention to provide a harvesting appliance that may be fastened to the arm of a harvester and which is not easily dislodged in use.

Another object of my invention is to provide, in a harvesting appliance of the type described, a receiver or receptacle for the accumulation of the crop being harvested and which device will serve also as a distribution hopper for depositing the harvested product in suitable transfer containers.

A further and more specific object of my invention is to provide, in a harvesting appliance of the type described, a construction that is easy to use, light in weight, and will not be deleteriously affected by hard usage in the handling of vine or bush or tree crops.

The foregoing objects and others ancillary thereto I prefer to accomplish as follows:

According to a preferred embodiment of my invention, I provide a base board having straps thereon, for attaching the board to the forearm of a harvester. In addition, adjustable hinged means is provided for the attachment and support of the device from a lower portion of the upper arm.

Carried on the side of the base is a storage receptacle which is pivoted to swing and has a gate at the then lower end for dispensing an accumulated portion of the crop into suitable transfer containers. Within the hopper is a primary reception shelf and an accumulation chamber divided from each other by a suitable swing gate to prevent the accidental flow of accumulated crop from the accumulation chamber back to the primary collection chamber. This container is adapted to be securely dogged in place during the harvesting operation, and means are provided whereby the dog and the container may be dislodged respective to each other whereby the container may thereupon swing about the pivot under the urgence of the weight of an accumulated portion of the crop. Means are also provided to return the empty container to its normal position for use.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is a view in perspective of my agricultural harvesting appliance;

Figure 2 is a horizontal sectional view of the collecting container and the supporting base board employed therewith as shown in Figure 1;

Figure 3 is a vertical sectional view of the structure of Figure 2;

Figure 4 is a vertical sectional view taken on line 4—4 of Figure 2;

Figure 5 is a vertical sectional view similar to Figure 3, but with the collecting container swung to a dumping position; and Figure 6 is a vertical sectional view taken on line 6—6 of Figure 5.

A harvesting appliance, to overcome the defects hereinbefore enumerated, must have at least two totally distinct characteristics: it must be capable of being readily attached to the arm of a user; and it must also provide ready accumulation and dumping facilities for use by a harvester in the rapid but careful handling of small fruits and berries. Accordingly, a preferred embodiment of my invention, specifically referring to Figure 1 of the drawing, is constituted by an elongated base board 10 which is provided with arm straps 12, 12 that may be secured about the forearm by means of buckles 14, 14. Upright arms 16 provide spaced apart pivots 17 for an arm band 18 which partially encircles a portion of the upper arm above the elbow and is secured in place by means of the strap 20 and buckle 21. The entire structure may be additionally supported from the shoulders and upper part of the body by the shoulder strap 22.

Arms 16, 16 are adjustably mounted upon the base board and for that purpose have forwardly extending members 24, 24 which are downturned at 25 on their forward ends to fit into any of a series of holes 26 in the base 10.

At its forward end on the upper surface the base member 10 supports an inverted U-shaped guide loop 28 through which the hand and wrist of a picker is inserted.

I provide a pivot pin 30 which passes through an offset journal portion of the base 10 and is spring loaded by means of the coil spring 32. Upon the opposed end of the pin 30 is mounted a collecting chamber 34 having an opening at 35 into the primary collection chamber 36 and having rearwardly therefrom an accumulation chamber 38. A free swinging gate 40 between chambers 36 and 38 permits the passage of a portion of the picked fruit from the chamber 36 where it is deposited upon the shelf 37 into the chamber 38.

At the rear port 40' from chamber 38 I mount a gate 42 which is pivoted to swing about pin 44 and has thereon the thumb button 46. When the gate is swung as shown in Figure 6 to the open position fruit and berries accumulated in chamber 38 may be deposited in suitable transfer containers such as berry boxes or the like.

In a recess 50 in the wall of the container 34 that lies adjacent the base member 10 is fitted a lug 52. These two parts are retained together by the biasing action of the spring 32.

In normal use the picker has the base board 10 strapped to his arm and about the forearm and in this position there is no hindrance to his bending the elbow as he picks. Fruit is usually deposited through the opening 35 on the shelf 37 where a small portion accumulates. By raising the arm slightly this fruit is permitted to slide off the shelf 37 into chamber 38 by the swinging action of the door 40; but note that a forward shifting of accumulated fruit within the chamber 38 toward the chamber 36 is prevented since gate 40 is permitted to swing only rearward and not forward as it abuts the rear edge of shelf 37 when closed.

When it is desired to dump chamber 38, the operator may press with his thumb against the nearest side of container 34, displacing the recess 50 and lug 52 with respect to each other and, since the greater weight of accumulated fruit in the container is to the rear of the normal pivotal center, the container will swing from the position of Figure 3 to that of Figure 5, whereupon the gate 42 may be opened and the fruit deposited in a transfer container. Upon the completion of the depositing operation the return spring 54 will cause the container 34 to swing forwardly where the dog and recess 52, 50 are reengaged.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A picking appliance, comprising a support member to be secured to an arm, a receptacle, means for pivotably supporting said receptacle by said support member to swing about a horizontal axis, said receptacle including a port to receive harvested material when the receptacle is substantially horizontal and a discharge port, a latch between said receptacle and said support member to retain the receptacle in a substantially horizontal position, said latch being releasable whereby said receptacle may swing to an upright position, and a gate on said receptacle closing the discharge port.

2. A picking appliance, comprising: a member to be secured to an arm, a receptacle, means for pivotably supporting said receptacle by said member to swing about a horizontal axis, said receptacle including a port to receive harvested material when the receptacle is substantially horizontal and a discharge port, a latch between said receptacle and said member for retaining the former in crop receiving position, said latch being releasable whereby said receptacle may swing to an upright discharge position, said receptacle being so mounted to swing that the accumulation of predetermined amount of crop will, upon the receptacle being released, swing the same under the urgence of gravity to a discharge position, means for returning the discharged receptacle to the crop accumulating position, and a gate on said receptacle closing the discharge port.

3. A picking appliance, comprising: a member to be secured to an arm, a receptacle, means for pivotably supporting said receptacle by said member to swing about a horizontal axis, said receptacle being interiorly divided into a reception chamber and an accumulation chamber, a gate within said receptacle between said chambers and only openable to permit the movement of products being harvested from the reception chamber to the accumulation chamber, said receptacle including a reception port and a discharge port, a latch between said receptacle and said member for retaining the former in a crop accumulating horizontal position, said latch being releasable whereby said receptacle may swing to an upright discharge position, and a gate on said receptacle closing the discharge port.

4. A picking appliance, comprising: a baseboard to be secured on a forearm and including means for so securing the same, means pivoted on said baseboard to be secured to the arm above the elbow, a receptacle having a pivot mounting on one side of the baseboard whereby said container may swing about a horizontal axis, said container including a reception and discharge port, a latch between said receptacle and said baseboard to retain the former in a horizontal crop receiving position, and a gate on said receptacle closing the discharge port.

AUBY J. MANSFIELD.